June 6, 1950  C. H. STOWE  2,510,841
APPARATUS FOR MOLDING THERMOSETTING PLASTIC MATERIALS
Filed Dec. 22, 1945  2 Sheets-Sheet 1

Inventor
Clarence H. Stowe
By Ira Milton Jones
Attorney

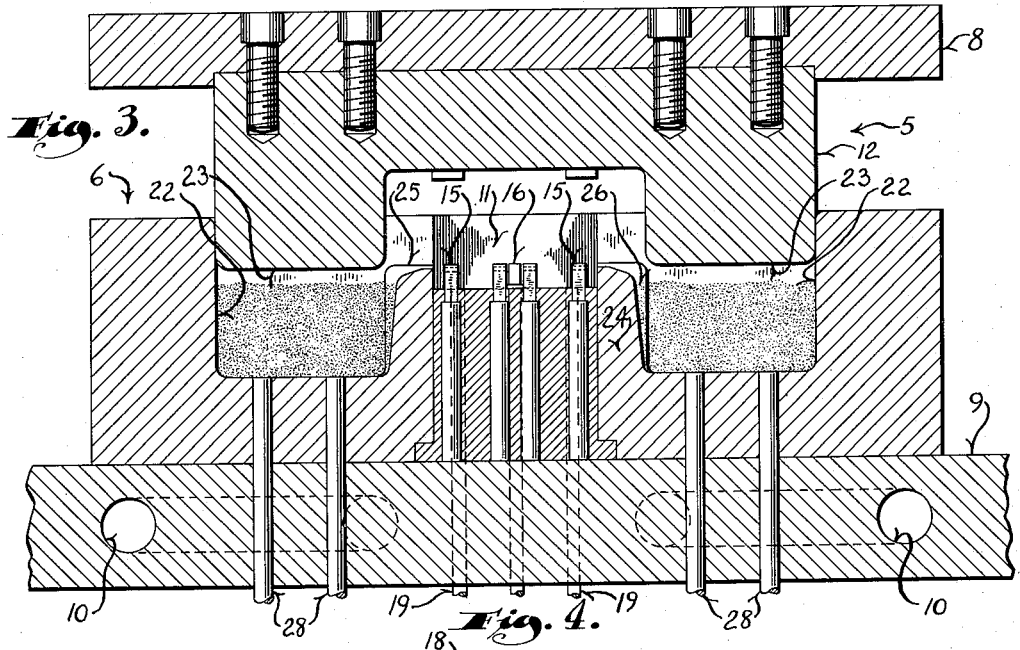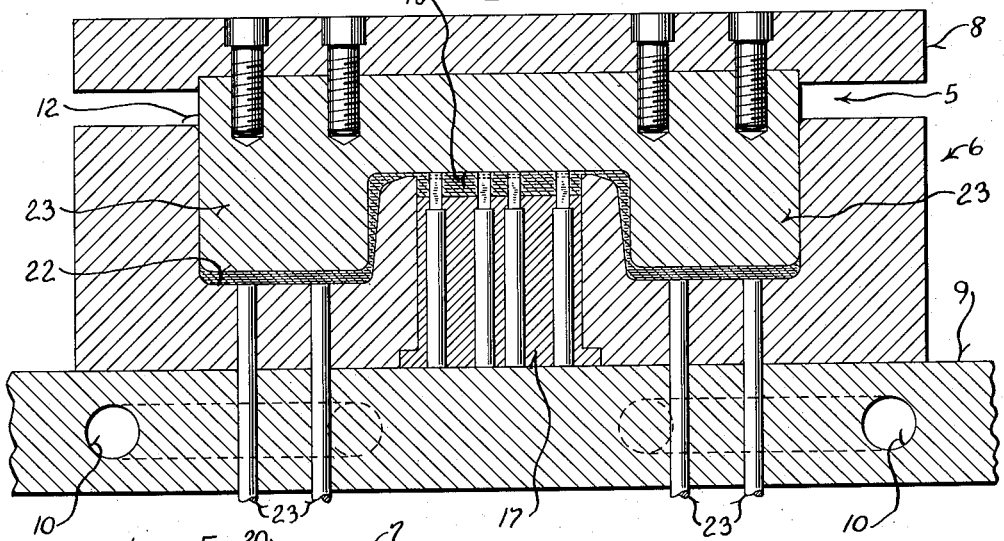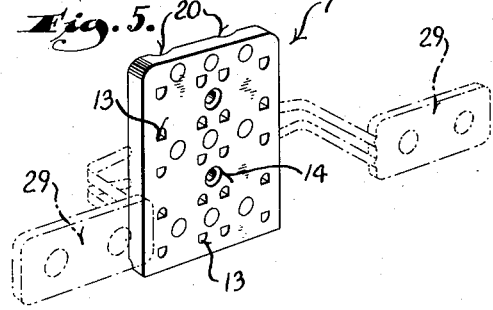

Patented June 6, 1950

2,510,841

UNITED STATES PATENT OFFICE 2,510,841

APPARATUS FOR MOLDING THERMO-SETTING PLASTIC MATERIALS

Clarence H. Stowe, Milwaukee, Wis.

Application December 22, 1945, Serial No. 636,805

4 Claims. (Cl. 18—42)

This invention relates to apparatus for molding plastic materials and refers more particularly to the molding of thermosetting materials. In a broad sense, this invention partakes of some of the aspects of the so-called transfer type molding of which the Shaw Patents Numbers 1,916,495, 1,919,534, 1,993,942 and 1,997,074 are examples, in that the material to be molded is caused to flow while in a plastic state from a receiving, preconditioning chamber into the mold cavity during the molding operation.

There is, however, a vital and significant distinction between the present invention and transfer type molding. In transfer type molding, the pressure on the material in the mold cavity is applied hydrostatically not positively. In other words, the material is forced from a reservoir into the mold cavity by positive pressure on the material in the reservoir but the pressure on the material forced into the mold cavity is effected purely by hydrostatic action.

As a consequence it is difficult, and in some cases impossible, to obtain uniform density in the molded article or casting. If the part to be molded has a complex, intricate shape, the varying resistance to flow which the correspondingly complex and intricate shape of the mold cavity presents, inevitably results in variations in the pressure applied to the material in the different parts of the mold cavity. Even where the part to be molded is of relatively regular shape, transfer type molding has disadvantages as it is difficult to obtain sufficient pressure through hydrostatic action to insure the desired density in the molded piece.

In ordinary compression type molding which preceded transfer molding, the molding pressure on the material in the mold cavity is positive so that the desired density in the molded part can be achieved, but in compression type molding, the solid molding material which may be in powdered, granular or tablet form, must be deposited directly into the mold cavity. For simple regular shapes this may be satisfactory, but if the piece to be made requires the use of small cores or inserts or has small passages or intricate shapes, compression type molding is entirely unsatisfactory. In such cases the brute force required to disperse the material throughout the mold cavity and the resistance to flow which characterizes the material in the mold, displaces, bends and often breaks off small cores and projections extending into the mold cavity. Also there is danger of small passages and corners of the mold cavity being left entirely unfilled due to their being blocked by a particle or piece of molding material wedged in the mouth of such passage or across the corner.

In summation, therefore, transfer type molding has the advantage of insuring the complete filling of the mold without danger of breaking off or bending small core inserts or projections in the cavity because the material is plastic and flows readily at the time it enters the mold cavity, but because transfer type molding relies solely upon hydrostatic pressure it is difficult to obtain uniform and sufficient density in the finished part.

Compression molding, while it overcomes this objection of transfer type molding, has the disadvantage of making the complete filling of the cavity difficult and unreliable and incurs the risk of breaking off small cores and projections in the mold cavity.

In recognition of these deficiencies of past molding methods, the present invention has as one of its objects to provide an improved apparatus for molding potentially reactive thermosetting materials which combines the advantages of transfer type and compression type molding without the disadvantages thereof.

In this connection, it is more specifically an object of this invention to provide apparatus for molding potentially reactive thermosetting materials by the use of a two-element mold, wherein the material to be molded is first placed in one or more preconditioning chambers, pots or wells and therein brought to a plastic flowable state by heat and pressure produced by relative movement of the mold forming elements towards their mold forming positions, which pressure is utilized to force the plastic material into the mold cavity before the mold is fully closed so that the final closure of the mold imparts positive molding pressure on the material therein.

Another object of this invention is to provide an improved apparatus for molding plastics wherein uniform heating of the material being molded is assured.

Another object of this invention is to provide apparatus for molding plastic materials which obviates the need for complicated expensive mechanism due to the fact that all processing of the material from the time it is placed in the preconditioning chamber, pot or well until it is taken from the mold cavity as a finished molded product, takes place within the die itself.

Still another object of this invention is to provide an apparatus for molding thermosetting plastic material which requires no special press equipment and one wherein a press with relatively small "day light" may be used.

A further object of this invention is to provide apparatus for molding plastic material which reduces the percentage of waste material considerably below that entailed by previously used molding methods, and particularly transfer type molding which has been quite widely used.

With the above and other objects in view which will appear as the description proceeds, this invention resides in the novel method of procedure employed and in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 3 is a vertical sectional view through the complete mold and showing the elements thereof about to close on each other;

Figure 4 is a view similar to Figure 3 but showing the mold closed; and

Figure 5 is a perspective view of the finished article or casting produced by the mold illustrated.

Figure 1:
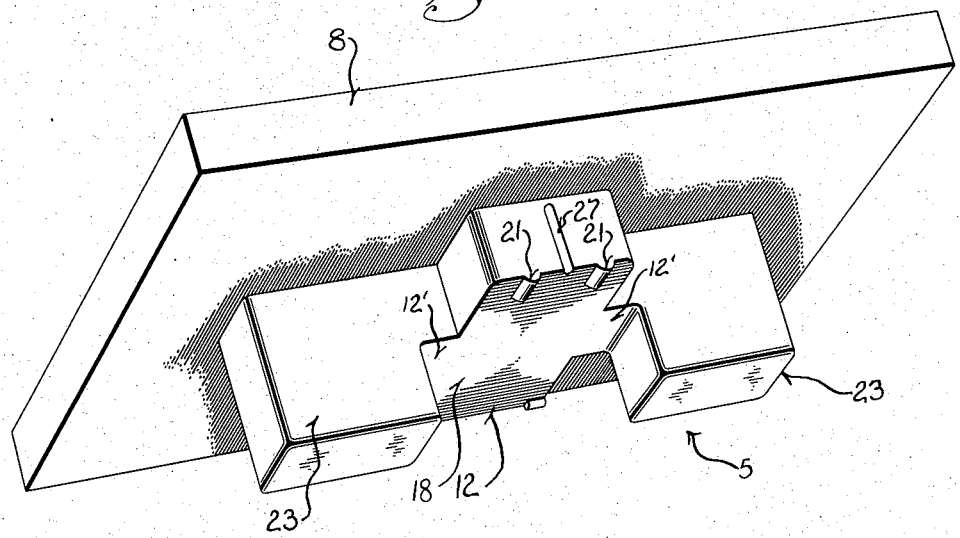
Figure 1 is a perspective of the upper one of the two mating or complementary mold forming elements employed in the practice of this invention.
Figure 2:
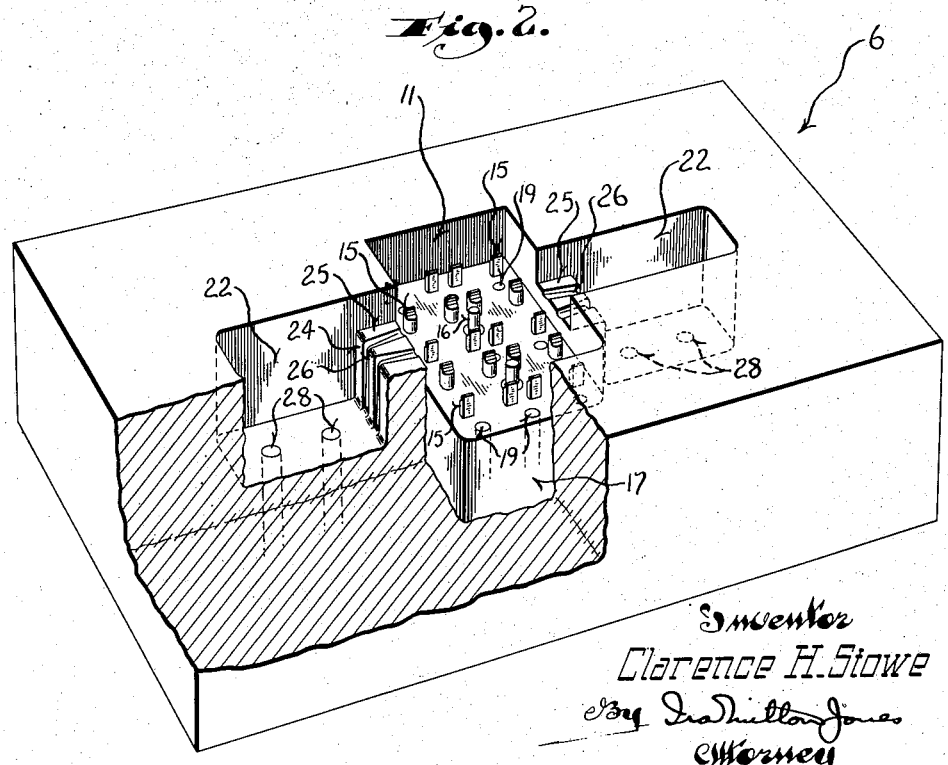
Figure 2 is a perspective view of the lower one of said two mold forming elements with parts broken away in section to more clearly illustrate the structural details thereof.

Referring now more particularly to the accompanying drawings, numerals 5 and 6 indicate the upper and lower elements, respectively, of a two-element mold designed to produce the article 7 shown in Figure 5.

The upper element 5 may be considered a punch and the lower element 6, a die. In operation, the two elements are brought together in mating relation to close the mold by the action of the press (not shown) in which the mold is mounted. To facilitate mounting the mold in the press, the punch is secured to a plate 8 adapted to be attached to a punch shoe (not shown) which in turn is fixed to the head of any conventional hydraulic press, and the die 6 is secured to a die shoe 9 adapted to be fixed to the platen of the press. Attention is directed to the simplicity which characterizes the mounting of the punch and die in the press and the fact that no special type of press is required.

The die shoe 9 and also the punch shoe (not shown) are adapted to be heated in any suitable manner as by circulating steam through passages 10 formed therein. These passages preferably should be uniformly distributed so that the punch and die will be uniformly heated.

Inasmuch as the article to be molded in the present case is essentially a rectangular block, the mold cavity 11 is wholly within the die and the punch 12 merely enters the same to close the top thereof. The multiplicity of odd shaped openings 13 and 14 which extend through the molded block are produced by small core pins 15 and 16 rising up from the bottom of the mold cavity.

It is convenient, though not necessary, to have the bottom of the mold cavity formed by an insert 17 mounted in the die. The core pins 15 and 16 are seated in this insert 17 with their upper ends projecting therefrom to enter the mold cavity, and as the holes they are to form pass entirely through the finished piece, the flat bottom 18 of the punch 12 contacts the top ends of the pins when the mold is closed. The insert 17 also has a suitable number of knock-out pins 19 passing slidably therethrough and through the die shoe 9 for ejecting the casting from the mold cavity when the molding operation is complete and the press is opened. The actuation of the knock-out pins is in accordance with conventional practice.

In the present case the finished article also requires several recesses 20 in its back surface. Hence, the punch has projections 21 extending down from its flat bottom 18 to define these recesses.

At each side of the mold cavity 11 is an open well or pot 22. These wells or pots provide preconditioning chambers to receive the charge of molding material which may be in powdered, granular or tablet form. In any event, the quantity of material deposited in the two chambers 22 is more than sufficient to completely fill the mold cavity. Instantly upon the insertion of the material into the chambers 22, it begins to plasticize due to the heated condition of the die. The material is completely plasticized by pressure in the presence of the heat, the pressure being derived from the closing of the mold. To this end the punch has two plungers 23 of a size and shape to enter the chambers 22 with a piston-like action.

It is to be observed that the wells or pots 22 are deeper than the mold cavity and that the plungers 23 extend correspondingly farther down from the punch 12. Thus, during closure of the mold the plungers 23 enter the wells or pots 22 in advance of the entry of the punch 12 into the cavity 11, but the punch 12 telescopes a substantial distance into the cavity 11 before the mold is fully closed. The piston-like action of the plungers 23 coacting with the heat plasticizes the material in the wells or pots, displaces and spills it over the walls 24 which separate the mold cavity from the wells or pots and in a sense constitute weirs.

The top surfaces 25 of the walls 24 serve as lands for the punch when the mold is fully closed, being engaged by isthmus-like portions 12' which connect the punch 12 with the plungers 23. Thus, the top surfaces 25 of the walls 24 are spaced from the bottom of the mold cavity, a distance equal to the thickness of the piece to be molded.

As the plungers 23 enter the wells or pots 22 to apply pressure on the material therein, flow communication is maintained between the mold cavity and the wells or pots by runners 26 in the top and outer sides of the walls 24 so that the plastic material can flow freely into the mold cavity. The runners 26, it will be noted, extend down to the bottom of the wells or pots 20. This allows the plungers to be brought far down into the wells or pots to expel most of the material therefrom, and thus minimize waste.

The air entrapped in the mold cavity when the punch enters the same is vented through a small groove 27 formed in one end wall of the punch. This groove also receives any excess material forced into the mold cavity, but in practice it is desirable to measure the quantity of material deposited in the wells or pots 22 quite accurately so as to further avoid waste. In the molding of a regular shaped article such as that shown in Figure 5, the location of the vent groove 27 is not critical but for intricate pieces, its location is important. By placing it at an area which is normally the last to be filled, assurance will be had that this area will be filled without difficulty. It is, of course, to be understood that the vent opening is kept small enough not to affect the molding pressure.

Knock-out pins 28 like the knock-out pins 19 pass slidably through the bottom of the die and die shoe to enter the wells or pots 22 and eject the hardened portions 29 remaining in the wells or pots when the molding operation is finished. These portions 29, as shown in broken lines in Figure 5 remain joined to the finished casting, but the small cross section of their junctures with the casting makes it a simple matter to break them off.

It will be readily apparent to those skilled in the art that the arrangement of the preconditioning chambers formed by the wells or pots 22, with respect to the mold cavity or cavities is susceptible to wide variation and depends only upon the nature of the piece to be molded and the capacity of the press. In the embodiment of the invention illustrated, a single mold cavity has been shown supplied from two preconditioning chambers arranged symmetrically at opposite sides thereof. In commercial practice, of course it would be customary to multiply the mold cavities to the maximum number permissible by the press capacity. Each cavity might be supplied from its own well or a plurality of cavities might be clustered around a common central well, but in any event, the method employed will be the same.

Briefly stated, the method of this invention is as follows: a pre-measured quantity of material is deposited in the well or wells 22 in the die where it immediately begins to plasticize because of the temperature at which the die is maintained. For the ordinary thermosetting materials, the die is kept at a temperature of approximately 320° F. Thus, within a matter of seconds, the material is transformed from its commercial powdered, granular or tablet form into a semi-plastic or semi-flowable state. As the mold closes and the hot plungers 23 on the punch enter the wells the material therein is further heated and subjected to pressure, the effect of which added to that of the heat quickly makes the material plastic and flowable so that as the closure of the mold continues the material flows readily from the well or wells into the mold cavity. Due to its fluid state, it quickly enters all portions and branches of the mold cavity regardless of their size or shape without subjecting small core inserts or projections to deforming stress.

The filling of the mold cavity is completed before the mold is fully closed and the isthmus-like portions 12' seat on the lands 25. Thus, during the final closure of the mold, the material within the mold cavity and, of course, that also within the wells 22 is subjected to positive molding pressure applied directly by the mold forming elements as distinguished from the hydrostatic pressure employed in transfer type molding. As a consequence, uniform density is assured throughout all portions of the finished casting.

It will also be apparent that due to the telescoped relation of the mold forming elements, the punch and die, there is no problem of flashing which sometimes occurs in transfer type molding as a result of the pressure on the material in the reservoir being great enough to force the mold sections apart; and experience has shown that as compared to approximately fifty percent (50%) waste which characterizes the transfer type molding, the present invention entails only ten to fifteen percent (10-15%) waste.

Another advantage of the present invention resides in the fact that more units can be made with one die than is possible with the transfer type process for the reason that the pressure required to force the material from the well or wells into the mold cavities and to complete the molding is not as great as that required in the transfer molding where the pressure on the material in the mold cavities is applied hydrostatically.

A further advantage of the present invention is that it requires considerable less "day light" in the press than is necessary for transfer type molding; also in the present invention the heat comes from only two sources close to the mold per se, namely, from the die shoe directly under the die and from the punch shoe directly above the punch, whereas with transfer type molding there are three separate platens that must be heated. This is a distinct advantage for not only does it effect an economy in heat loss but what is more important it makes it much easier to maintain uniform heating. In the transfer type molding the need for heating an additional platen together with the increased "day light" required makes it difficult to maintain uniform heating.

A still further advantage of this invention over transfer type molding resides in the fact that the location of the knock-out pins for ejecting the finished castings is not constrained to the lower element of the mold. In this respect the present invention retains the advantage of ordinary compression molding as it permits the knock-out pins to be located in the punch as well as in the die so that such parts as tend to cling to the punch by virtue of their shape, may be readily loosened as the mold opens.

From the foregoing description taken in connection with the accompanying drawings, it will be readily apparent to those skilled in the art that the method and apparatus of this invention has many advantages and benefits in addition to those enumerated.

What I claim as my invention is:

1. Apparatus for molding thermosetting materials, comprising: mating upper and lower mold forming elements; an open-topped preconditioning chamber in the lower mold forming element large enough to receive the entire charge of solid potentially reactive thermosetting material; said mold forming elements coacting to form a mold cavity spaced from the preconditioning chamber upon being brought together; a weir interposed between and separating the preconditioning chamber from the portion of the mold cavity formed in the lower element; means for heating the material in the preconditioning chamber to initiate plasticization thereof; and a plunger on the upper mold forming element positioned to enter the preconditioning chamber as said elements are brought together to apply pressure thereon and further plasticization of the material in the chamber, said plunger projecting down farther than the cavity-defining-portion of the upper element so that material in the preconditioning chamber is displaced therefrom over the weir and into the mold cavity to fill the same before the mold is fully closed and whereby the final closing motion of the mold forming elements applies positive molding pressure on the material in the mold cavity.

2. Apparatus for molding plastics comprising: mating male and female mold forming elements, the female element having an open cavity defining part of a mold; the male element having a portion adapted to cooperate with said cavity to complete the mold when said elements are brought into final molding relationship, the attainment of such relationship entailing relative movement of said elements toward one another; a well in the female element adapted to hold the entire charge of the material to be molded; means on the female element defining a barrier lying between the well and the cavity and separating the same from one another; means on said barrier defining a channel providing flow communication between the well and the cavity in the female element; and a plunger on the male element adapted to enter the well and force material from the well to effect introduction of expelled material into the cavity, said plunger being longer than the portion on the male element which cooperates with the cavity so as to enter the well in advance of the mating of said portion on the male element with the cavity, and said well and cavity being of such relative proportions that sufficient material to make the part to be molded is forced into the cavity before said portion on the male element reaches its final molding position so that molding pressure is applied directly to the material in the mold by the final closure of the mold.

3. Apparatus for molding thermosetting materials comprising: means defining a plasticizing chamber adapted to receive a charge of solid potentially reactive thermosetting material; means defining a mold cavity remote from the plasticizing chamber; a movable mold defining element cooperable with said mold cavity to define a complete mold; means defining a restricted passageway at all times connecting said plasticizing chamber with said mold cavity; plunger means cooperable with said plasticizing chamber to apply plasticizing pressure to material in the plasticizing chamber and to effect expulsion of plasticized material from the plasticizing chamber through said restricted passageway into the mold cavity; and means connecting said plunger with said movable mold defining element to effect motion of said movable element to its mold defining position when said mold cavity is substantially filled to thereby apply direct and positive pressure to the material in the mold cavity while at the same time said plunger maintains pressure in the plasticizing chamber to prevent return flow of material from the cavity through said restricted connecting passageway.

4. Molding apparatus comprising: complementary male and female elements movable relative to one another, the female element having a recess therein which defines a mold cavity and a well remote from said mold cavity but connected therewith by a restricted passageway and able to contain a substantially larger quantity of plasticized material to be molded than the mold cavity, the male element having a projection adapted to telescope into said recess, said projection including a plunger portion adapted to enter the well to apply plasticizing pressure to the material in the well and to inject plasticized material through the passageway into the mold cavity, said male element also including another portion adapted to cooperate with the mold cavity in the female element to define a complete mold so that in the final stages of engagement of said elements said male element applies direct and positive pressure to material in said mold cavity, while at the same time applying pressure to the remaining material in the well.

CLARENCE H. STOWE.

REFERENCES CITED

The following references are of record in the file of this patent:

UNITED STATES PATENTS

| Number | Name | Date |
|---|---|---|
| 1,658,567 | MacDonald | Feb. 7, 1928 |
| 1,683,755 | Bigelow | Sept. 11, 1928 |
| 2,072,349 | Wayne | Mar. 2, 1937 |
| 2,079,393 | Benge | May 4, 1937 |
| 2,251,858 | Snell | Aug. 5, 1941 |
| 2,351,329 | Gerstenmaier | June 12, 1944 |
| 2,377,128 | Burgess | May 29, 1945 |

FOREIGN PATENTS

| Number | Country | Date |
|---|---|---|
| 357,992 | Great Britain | Sept. 24, 1931 |